US009402454B2

(12) United States Patent
Landy

(10) Patent No.: US 9,402,454 B2
(45) Date of Patent: Aug. 2, 2016

(54) FLUID APPLICATION DEVICE

(76) Inventor: James Landy, Cape Canaveral, FL (US)

(*) Notice: Subject to any disclaimer, the term of this patent is extended or adjusted under 35 U.S.C. 154(b) by 1321 days.

(21) Appl. No.: 12/764,147

(22) Filed: Apr. 21, 2010

(65) Prior Publication Data
US 2011/0262209 A1  Oct. 27, 2011

(51) Int. Cl.
*A45D 34/00* (2006.01)
*A45D 34/06* (2006.01)

(52) U.S. Cl.
CPC .............. *A45D 34/00* (2013.01); *A45D 34/06* (2013.01); *A45D 2200/1063* (2013.01); *A45D 2200/25* (2013.01)

(58) Field of Classification Search
CPC ...................................................... A45D 34/06
USPC ......... 401/195, 131, 118, 137, 139, 123, 191; 222/192; 224/148.4, 148.5; D6/608
See application file for complete search history.

(56) References Cited

U.S. PATENT DOCUMENTS

| | | | |
|---|---|---|---|
| 2,707,292 A | 5/1955 | Lustbader | |
| 3,881,628 A | 5/1975 | Brainerd et al. | |
| 4,516,676 A | 5/1985 | Cournoyer | |
| 4,560,085 A | 12/1985 | Vom Hofe et al. | |
| 5,072,467 A * | 12/1991 | Hunt | 5/419 |
| 5,213,430 A | 5/1993 | Pandola | |
| 5,312,197 A | 5/1994 | Abramson | |
| 5,443,880 A | 8/1995 | Wike | |
| 5,467,487 A * | 11/1995 | Sicard | 5/419 |
| D389,623 S | 1/1998 | Kohlruss et al. | |
| 5,724,698 A * | 3/1998 | Mondragon | D6/608 |
| 5,879,094 A | 3/1999 | Lersch et al. | |
| 6,138,874 A | 10/2000 | Audrey | |
| 6,321,937 B1 | 11/2001 | DeSimone et al. | |
| 6,431,405 B2 | 8/2002 | Irwin | |
| 6,457,890 B1 | 10/2002 | Kohlruss et al. | |
| 6,644,563 B2 | 11/2003 | Presson | |
| 6,669,387 B2 | 12/2003 | Gruenbacher et al. | |
| 6,742,951 B2 | 6/2004 | Schultz et al. | |
| 6,883,989 B2 | 4/2005 | Kushner et al. | |
| 6,948,874 B2 | 9/2005 | Roberson | |
| 7,370,754 B2 | 5/2008 | Kushner | |
| 2007/0034650 A1* | 2/2007 | Pulch et al. | 222/192 |
| 2008/0050409 A1* | 2/2008 | Pechko et al. | 424/405 |

OTHER PUBLICATIONS

U.S. Appl. No. 63/698,824, filed Oct. 17, 1972, Lorio.

* cited by examiner

*Primary Examiner* — Jennifer C Chiang
*Assistant Examiner* — Bradley Oliver
(74) *Attorney, Agent, or Firm* — Stephen C. Thomas

(57) ABSTRACT

A fluid application device for applying a fluid to a surface and removing the same as necessary. The device may generally comprise a fluid applicator and a textile base member for sanitizing gym equipment, wiping windows, applying sunscreen, and the like. The fluid applicator may comprise a spray applicator, a permeable bladder, and the like. The textile base member may include but is not limited to a hand towel, a wristband, and any other known textile configurations. In one embodiment, the present invention may be used by gym patrons to sanitized gym equipment before and/or after use. The present invention may also be used to clean other surfaces including but not limited to household windows, vehicle windows, and the like. Additional embodiments of the present invention may also be used either to apply sunscreen on a user or as a fishing towel to clean hands and remove odor.

20 Claims, 4 Drawing Sheets

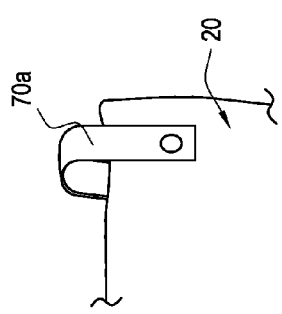
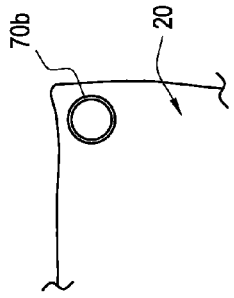
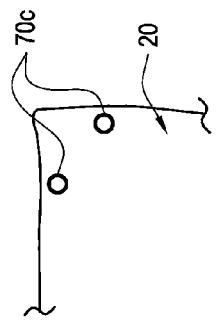
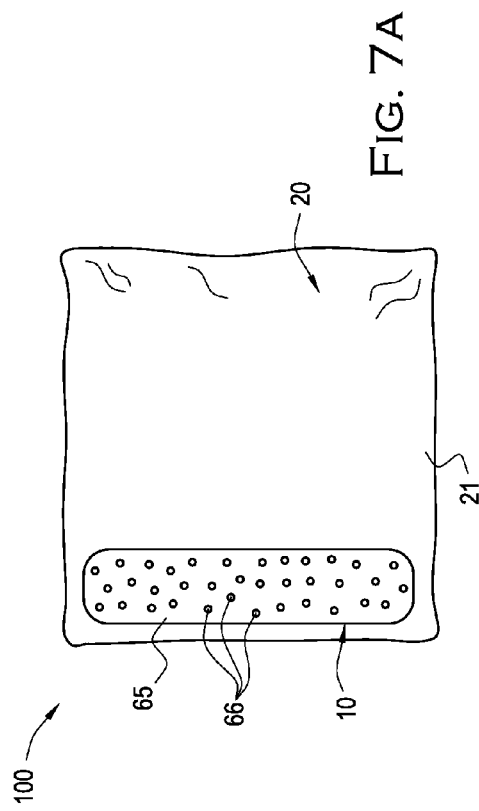
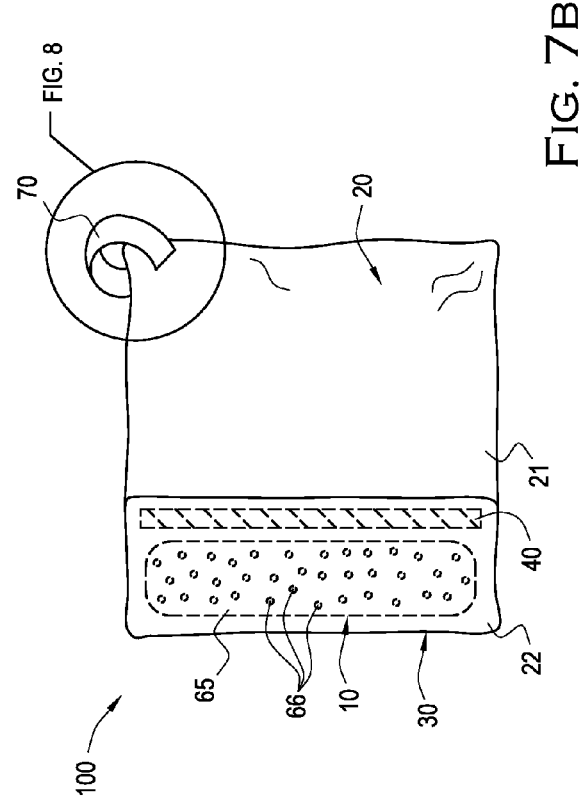

US 9,402,454 B2

FLUID APPLICATION DEVICE

CROSS REFERENCE TO RELATED APPLICATIONS

Not applicable.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISK

Not applicable.

BACKGROUND OF THE INVENTION

1. Field of the Invention

The present invention generally relates to a fluid application device for applying fluid to a surface that may include but is not limited to gym equipment, eyeglasses, golf balls, mirrors, the skin of an individual, and other surfaces or items. More particularly, the invention relates to a portable integrated device that is capable of delivering a cleaning agent or other fluid to a surface and withdrawing the same if needed in a convenient and efficient manner.

2. Background Art

The prior art is replete with dual function devices contained in a single unit as can be seen by reference to U.S. Pat. Nos. 5,724,698; 5,879,904; and 6,457,890. However, as anyone that has sanitized gym equipment, washed windows, and the like can attest to, there has been a long felt need for a single implement that would contain all of the necessary elements employed in that task.

U.S. Pat. No. 5,724,698 to Mondragon discloses an improved dual-purpose golf and gym folded pocket towel having a concealed pocket therein for holding articles. While a towel with a concealed pocket may be used in cleaning golf implements and equipment and for drying perspiration from the face, hands, and gym equipment, the towel provides neither a fluid source nor a fluid applicator element.

U.S. Pat. No. 5,879,904 to Lersch et al. discloses a pressure-deformable wiper cushion for wiping misted and/or dirty flat surfaces such as the insides of vehicle windows. The pressure-deformable wiper cushion further includes a cleaning cover and a cushion filling enclosed by and filling out the cleaning cover.

U.S. Pat. No. 6,457,890 to Kohlruss et al. discloses a cleaning device including a hollow body provided with at least one flat cleaning surface and at least one outlet and filling opening. An absorbent cleaning material is detachably secured to the hollow body.

As one functional example, most people when sanitizing gym equipment carry a roll of paper towels, an individual paper towel, or a textile hand towel and a separate fluid spray bottle. While most fluid spray bottles are relatively stable articles and will normally remain in the same location that they were placed; a roll of paper towels is a notoriously unstable article that also exhibits an almost uncanny ability to roll away and/or unravel at the most inopportune times. Additionally, in certain environment users may have to share one or more spray bottles and/or continually return to a common location or dispenser for fresh paper towels when cleaning or otherwise applying fluid to one or more surfaces.

Given the fact that we are discussing two separate items, and one of those items causes separate problems unique onto itself; it should be readily apparent that a totally new device is required to solve these problems. After long consideration and study, the combined device that forms the basis of the present invention was developed to provide that solution in a relatively simple, compact, portable, convenient to use manner.

BRIEF SUMMARY OF THE INVENTION

In accordance with one embodiment, a fluid application device comprising a fluid reservoir, a fluid applicator attached to and in fluid communication with the fluid reservoir, and a plurality of clips disposed on the fluid reservoir, wherein the plurality of clips provides a releasable attachment point between the fluid reservoir of the fluid application device and an optional textile base member.

The scope of the present invention further includes a fluid application device comprising a fluid applicator comprising a permeable bladder having a plurality of pores capable of exuding a fluid from within the permeable bladder when a compressive force is applied to the permeable bladder, and a textile base member wherein the fluid applicator is attached to a first portion of the textile base member.

Yet still, the scope of the present invention further includes a fluid application device comprising a textile base member comprising a first layer and a second layer, the first layer comprising a greater surface area than the second layer, wherein the second layer overlays a portion of the first layer thereby forming a fluid reservoir cavity between the first layer and the second layer; a fluid reservoir disposed within the fluid reservoir cavity; a fluid applicator attached to and in fluid communication with the fluid reservoir; and at least one releasable connection securing the second layer to the first layer and providing releasable access to the fluid reservoir cavity.

BRIEF DESCRIPTION OF THE DRAWINGS

FIG. 7A depicts a front planar view of a permeable bladder embodiment of a device of the present invention.

FIG. 7B depicts a front planar view of another permeable bladder embodiment of a device of the present invention.

FIG. 8A depicts a magnified view of an embodiment of at least one region of a device of the present invention.

FIG. 8B depicts a magnified view of another embodiment of at least one region of a device of the present invention.

FIG. 8C depicts a magnified view of still another embodiment of at least one region of a device of the present invention.

DETAILED DESCRIPTION OF THE INVENTION

Although the following detailed description contains many specifics for the purposes of illustration, anyone of ordinary skill in the art will appreciate that many variations and alterations to the following details are within the scope of the invention. Accordingly, the following preferred embodiments of the invention are set forth without any loss of generality to, and without imposing limitations upon, the claimed invention.

Figure 1:
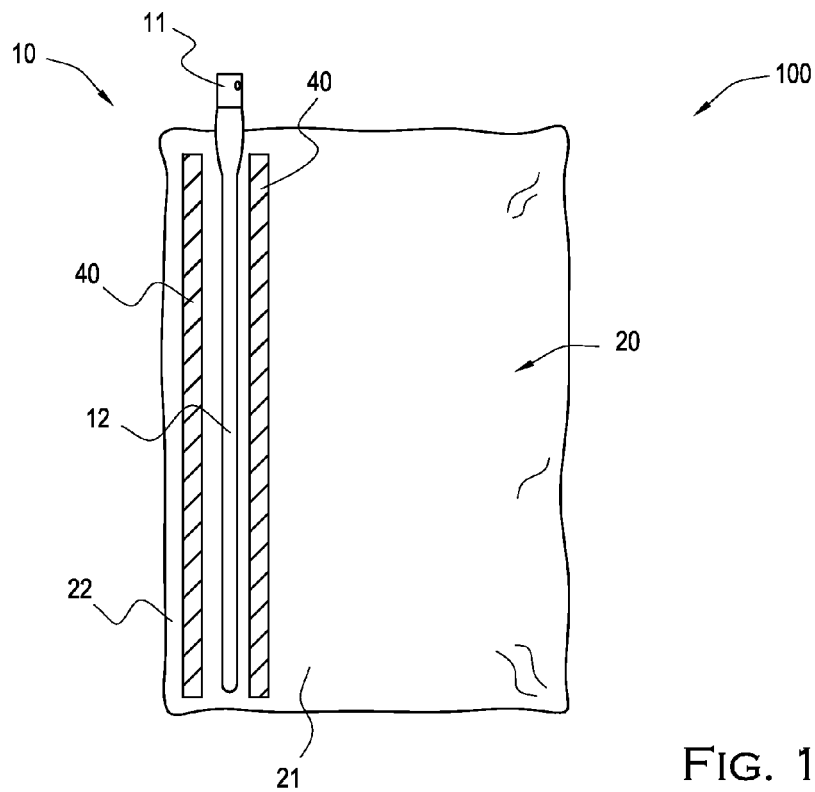
FIG. 1 depicts a front planar view of a spray applicator embodiment of a device of the present invention in an unfolded configuration.
Figure 2:
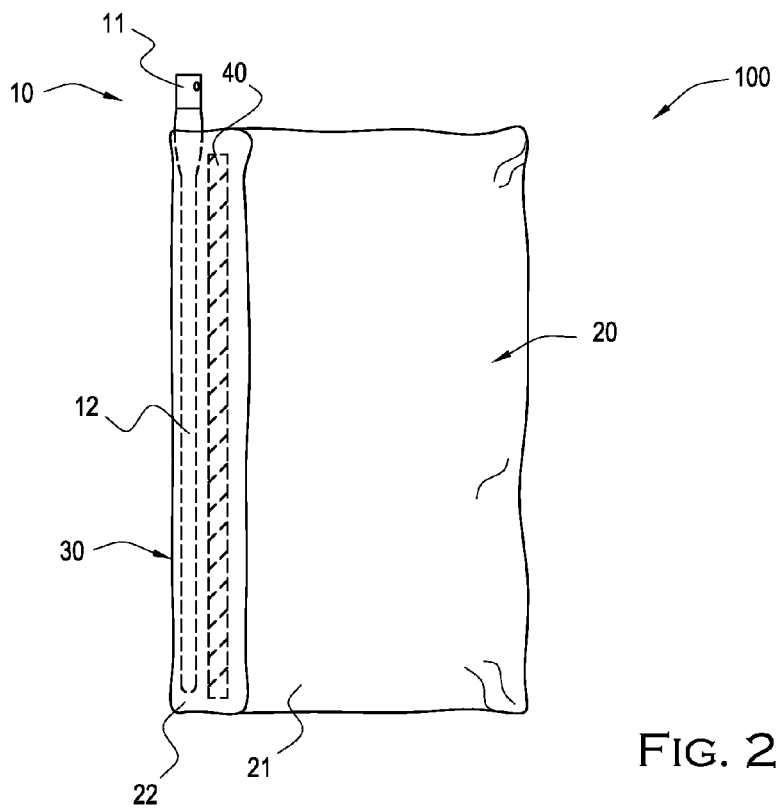
FIG. 2 depicts a front planar view of the spray applicator embodiment of the device of the present invention of FIG. 1 in a folded configuration.

One embodiment of a fluid applicator device 100 of the present inventions is illustrated in FIGS. 1-2. The device 100 may generally comprise a fluid applicator 10, a fluid reservoir 12, and a textile base member 20. In this embodiment, the fluid applicator 10 may further comprise a spray nozzle 11 in fluid communication with the fluid reservoir 12. The textile base member 20 may comprise a first layer 21 and a second layer 22, wherein the first layer 21 has a greater surface area than the second layer 22. As shown in FIGS. 1-2, the fluid reservoir 12 of the fluid application device 100 may be disposed within a fluid reservoir cavity that is formed by folding and overlaying the second layer 22 of the textile base member 20 over the first layer 21 of the textile base member 20. The second layer 22 of the textile base member 20 may be folded over at a fold point 30 and thereafter be secured to the first layer 21 by at least one releasable connection 40.

The fluid applicator 10, such as a spray nozzle 11, of the present invention may comprise any number of available configurations known within the art. FIGS. 1-4B and FIG. 6 generally depict the fluid applicator 10 or spray nozzle 11 as a finger-actuated pump spray head or a manual pump spray head. In alternate embodiments, the spray nozzle 11 may comprise a pistol-grip pump spray head (not shown) commonly used with traditional household cleaners. Additional alternate embodiments may include fluid applicators 10 having a pressurized fluid system between the spray nozzle 11 and the fluid reservoir 12 to both facilitate use of the device 100 and either eliminate or minimize the need to pump the fluid applicator 10 to dispense fluid.

The fluid reservoir 12 may contain a fluid to be dispersed by the spray nozzle 11. In a preferred embodiment, the fluid may comprise any cleaning agent known within the art including but not limited to cleaning agents possessing antiseptic, antimicrobial, antibacterial, antiviral, or antifungal properties. In one embodiment the device 100 may be used to sanitize gym equipment and in another embodiment the device 100 may be used as a fisherman's towel to sanitize the user's hands and remove odor. Alternate embodiments may comprise fluid reservoirs 12 containing other fluids having known beneficial functions including but not limited to sunscreen, indoor tanning creams or lotions, moisturizing creams or lotions, and any other cosmetic creams or lotions known within the art.

In a preferred embodiment of the textile base member 20 depicted in FIGS. 1-2, the textile base member 20 may comprise one unitary piece of textile or fabric having a fluid reservoir cavity formed by folding a first layer 21 of the textile base member 20 at a fold point 30 atop and overlaying the second layer 22 of the textile base member 20. Such a preferred embodiment minimizes both the total number of required components and the total number of potential points of failure for the device 100 of the present invention. Alternate embodiments may provide the second layer 22 of the textile base member 20 as a component that is separate and distinct from the first layer 21 of the textile base member 20. In such alternate embodiments, a first edge of the second layer 22 may be secured and attached to a first edge of the first layer 21. Securing and attaching the first edge of the second layer 22 to the first edge of the first layer 21 may take one of many forms including but not limited to stitching, hook and loop fasteners, at least one zipper, a plurality of buttons, and at least two complimentary snap fasteners.

No matter whether the textile base member 20 comprises one unitary piece or two secured pieces, the textile base member 20 comprises both the aforementioned first layer 21 and second layer 22 and further comprises at least one releasable connection 40. The at least one releasable connection 40 may include but is not limited to a structure selected from the group consisting of hook and loop fasteners, at least one zipper, a plurality of buttons, and at least two complimentary snap fasteners.

Figure 3:
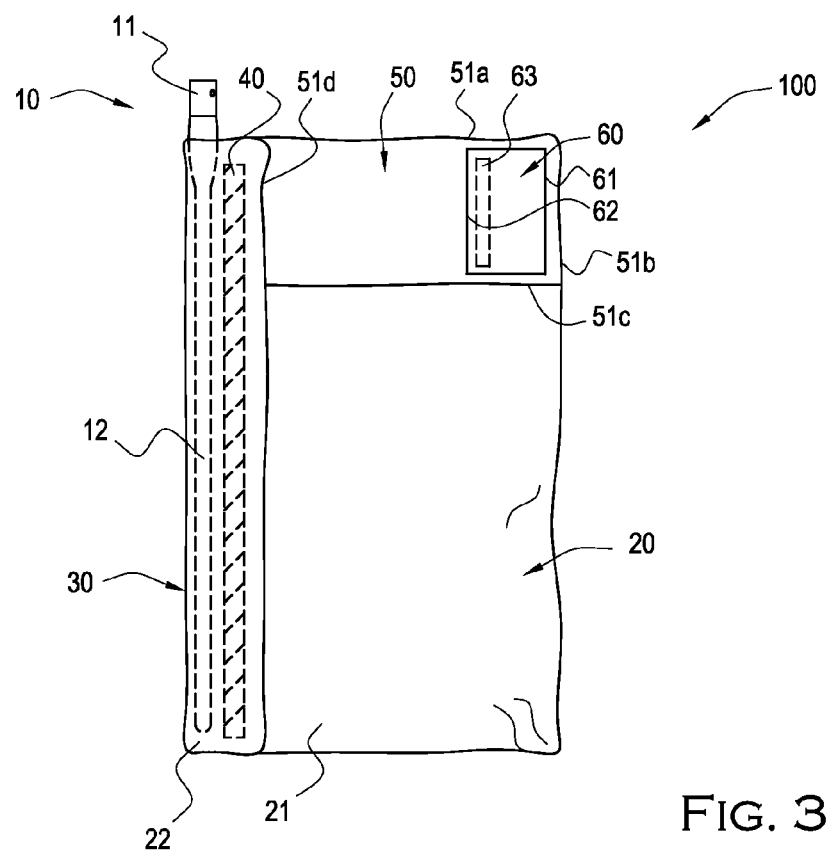
FIG. 3 depicts a front planar view of another spray applicator embodiment of a device of the present invention.

As an added feature a device 100 of the present invention, as shown in FIG. 3, may further comprise a utility pocket 50. The utility pocket 50 may be disposed on the first layer 21 of the textile base member 20. The utility pocket 50 may comprise four edges 51a-51d wherein three of the four edges 51a-51d are fixed to the first layer 21 of the textile base member 20. In this manner, the one non-fixed edge of the utility pocket 50 allows user access to the interior space of the utility pocket 50 that is defined by the three of the four edges 51a-51d that are fixed to the first layer 21 of the textile base member 20. The utility pocket 50 may be utilized for any number of uses including but not limited to the storage of one or more objects or, in a preferred embodiment of use, insertion of a user's hand for wiping a desired surface with either the first layer 21 of the textile base member 20 or the material comprising the utility pocket 50.

Still further, as shown in FIG. 3, the device of the present invention may comprise a storage case 60. The storage case 60 may be disposed either on the first layer 21 of the textile base member 20 or, if present, atop the utility pocket 50 as depicted in FIG. 3. The storage case 60 may comprise a first portion 61 that is permanently fixed to the underlying surface wherein the underlying surface is either the first layer 21 of the textile base member 20 or the material comprising the utility pocket 50. A second portion 62 of the storage case 60 may be releasable connected to the underlying surface by a releasable storage case connection 63 that provides access to the functional space defined within the storage case 60. The storage case 60 may be used to securely hold one or more objects within its releasably closed functional space until the user desires use of the one or more objects stored therein. In a preferred embodiment, a user may place their keys, license, phone, or any other daily use articles within the storage case 60 while the device 100 of the present invention is used, such as to clean and sanitize gym equipment during and/or after a workout session. Similarly in an alternate embodiment, a user may store their keys, license, or any other daily use articles within the storage case 60 while the device 100 of the present invention is brought with a user to the beach wherein the device 100 may be used to apply sunscreen from the fluid reservoir 12, provide a textile base member 20 for removal of excess sunscreen or for wiping a user's hands, and storing valuable items within the storage case 60 while visiting the beach location. The releasable storage case connection 63 may comprise any releasable connections known within the art including but not limited to hook and loop fasteners, at least one zipper, a plurality of buttons, and at least two complimentary snap fasteners.

Figures 4A, 4B:
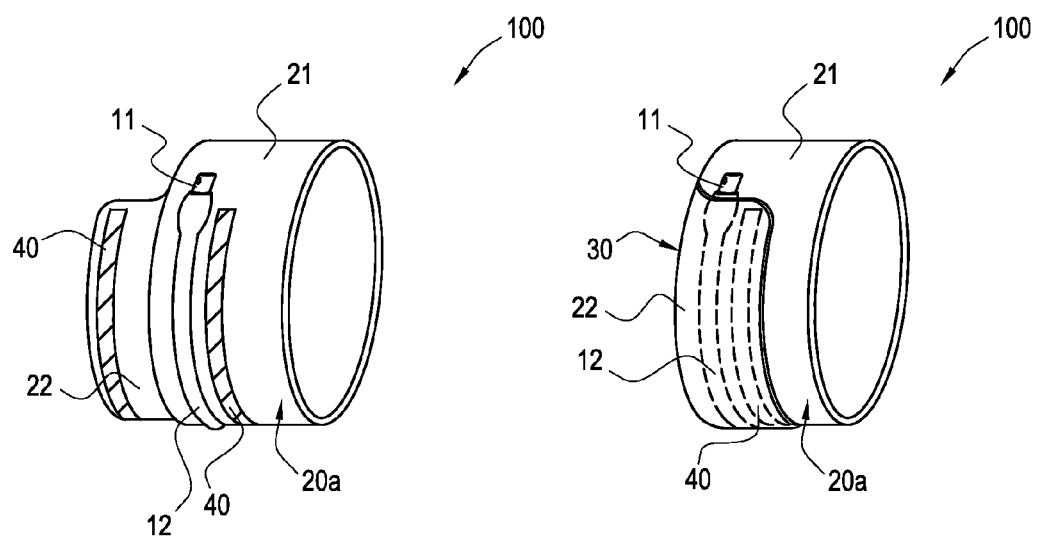
FIG. 4A depicts a front perspective view of another embodiment of a device of the present invention in an unfolded configuration.
FIG. 4B depicts a front perspective view of the embodiment of the device of the present invention of FIG. 4A in a folded configuration.

FIGS. 4A-4B depict an alternate wristband embodiment of the fluid application device 100 of the present invention. In such an embodiment, the textile base member 20 may comprise a wristband 20a instead of a towel as previously shown in FIGS. 1-3. Such an alternate embodiment of the textile base member 20 provides for analogous structures and utility as provided by the towel embodiment; however, the wristband embodiment of FIGS. 4A-4B further provides for increased portability and automatic storage of the device 100 about the user's wrist when the device 100 is not actively in use. As depicted in FIGS. 4A-4B, the wristband 20a embodiment and other alternate embodiments may also further incorporate the additional structural elements shown in FIGS. 1-3 as described above that may include a fluid applicator 10 such as a spray nozzle 11, a fluid reservoir 12, and a textile base member 20/20a comprising a first layer 21 and a second layer 22 forming a fluid reservoir cavity for the fluid reservoir 12, and at least one releasable connection 40. The scope of the present invention includes both the exemplary embodiments expressly disclosed herein, such as the towel and wristband embodiments, and all forms and configurations of textile base members known within the art.

Figure 5:
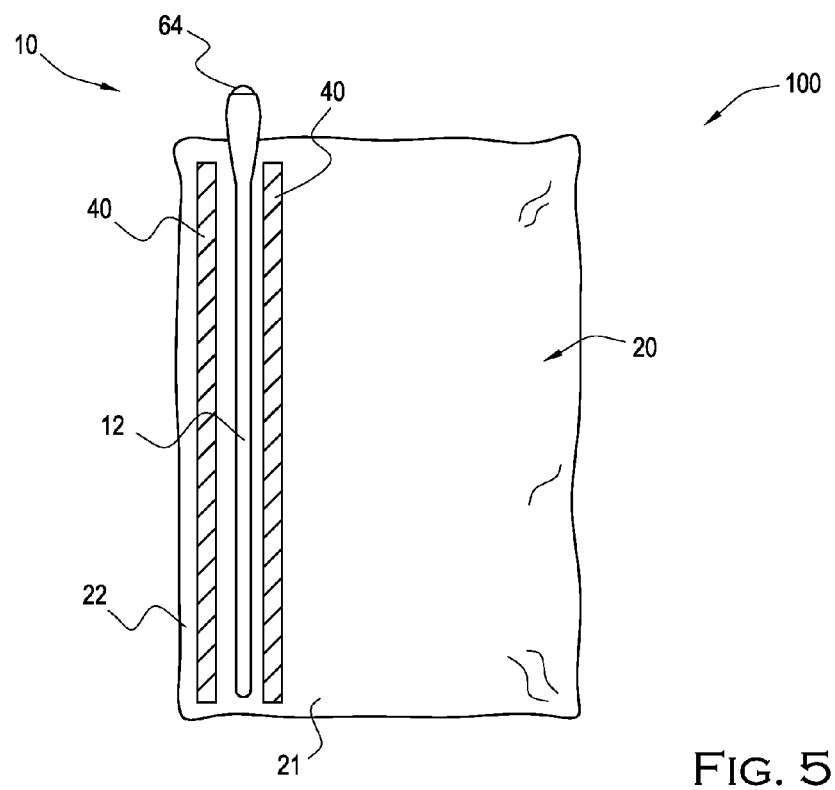
FIG. 5 depicts a front planar view of a roll-on applicator embodiment of a device of the present invention in an unfolded configuration.

FIG. 5 depicts an embodiment that is very similar to the above-described spray applicator embodiment that comprises a spray nozzle 11. The fluid applicator 10 of embodiment shown in FIG. 5 comprises a roll-on applicator 64. Such a roll-on applicator 64 may structurally comprise a rotatable ball member that is in fluid communication with a fluid reservoir 12. Examples of conventional roll-on applicators 64 are commonly found in structures of the prior art devices including but not limited to antiperspirant or deodorant sticks, ball-point pens, and the like. The fluid reservoir 12 of the roll-on applicator embodiment may be disposed within a fluid reservoir cavity that is formed by folding and overlaying the second layer 22 of the textile base member 20 over the first layer 21 of the textile base member 20. The second layer 22 of the textile base member 20 may be folded over at a fold point 30 (see FIGS. 2-3) and thereafter be secured to the first layer 21 by at least one releasable connection 40. Use of either the roll-on applicator embodiment or the spray applicator embodiment may be determined by the intended function and use of the device 100.

Figure 6:
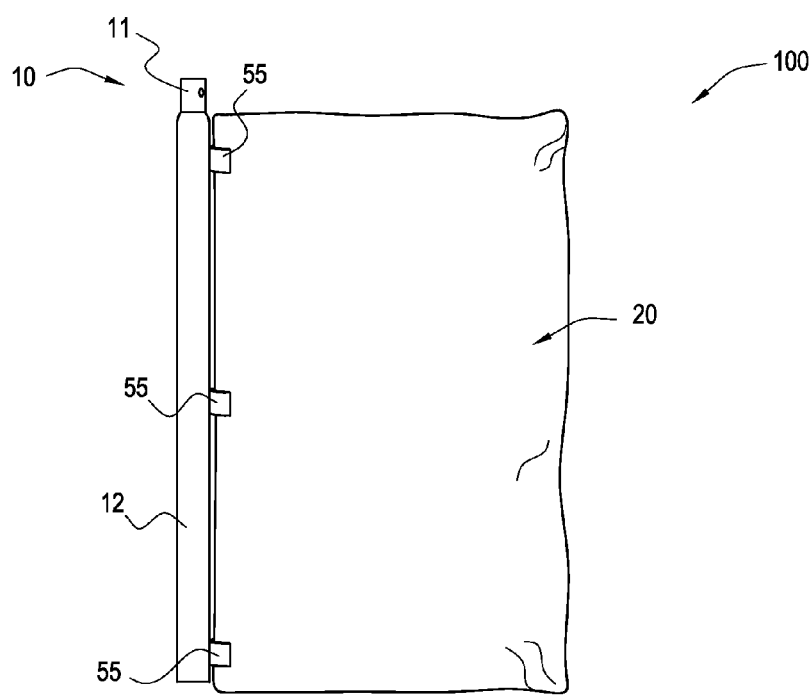
FIG. 6 depicts a front planar view of a spray applicator embodiment of a device of the present invention having a clip-on configuration.

FIG. 6 depicts an alternate method of attachment between the fluid applicator 10/fluid reservoir 12 and the textile base member 20. As shown in FIG. 6, a plurality of clips 55 may be attached to the fluid reservoir and provide a releasable attachment point to an optional textile base member 20. FIG. 6 depicts an exemplary embodiment utilizing three clips; however, within the scope of the present invention the plurality of clips 55 may include the use of one or more clips. The clip-on embodiment of the present invention provides the advantage of allowing a user to releasably attach the inventive device 100 to either a towel, wristband, or other textile base member 20 that may be provided to the user (such as by a gym) or owned the user. The plurality of clips 55 facilitate the separation of the fluid applicator 10/fluid reservoir 12 from the textile base member 20 and allows for both easier washing of the textile base member 20 and use of the fluid applicator device 100 on any available textile base member 20. The clip-on embodiment structure may be used for devices having spray nozzles 11, roll-on applicators 64, permeable bladders 65 (see description below), or any other fluid applicators known within the art and equivalents thereof. The plurality of clips 55 may comprise any releasable point of attachment structures known within the art including but not limited to spring-biased jaws, memory foam biased arms, resilient jaw members, rigid jaws movable between an open position and a closed position, and the like.

FIGS. 7A-7B further depict another embodiment of a device 100 of the present invention. The fluid applicator 10 of such a device 100 may comprise a permeable bladder 65 for retaining a fluid therein. The permeable bladder 65 may possess a plurality of pores 66 through which a fluid maintained within the permeable bladder 65 may exit the permeable bladder 65. The permeable bladder 65 may be configured to incorporate the textile base member 20 in at least two embodiments or variations.

In a first variation, as depicted in FIG. 7A, the permeable bladder 65 may be fixedly or releasably attached to the first portion 21 of the textile base member 20 and fluid exiting the plurality of pores 66 of the permeable bladder 65 upon application of a compressive force may then directly contact the desired surface. In such a configuration, both a second portion 22 and a fold point 30 forming a fluid reservoir cavity (such as that formed throughout FIGS. 1-5) are not necessary components of the device 100.

In a second variation, as depicted in FIG. 7B, the permeable bladder 65 may be disposed within a fluid reservoir cavity formed by overlaying the first layer 21 with the second layer 22 of the textile base member 20 and providing at least one releasable connection 40 there between. In a resting state the fluid may remain within the permeable bladder 65; however, upon application of a force (such as compression) on the permeable bladder 65 the fluid stored therein may exude or emanate through the plurality of pores 66 and thereby exit the permeable bladder 65 entering the fluid reservoir cavity and thereafter contacting the first layer 21 and/or the second layer 22 of the textile base member 20. The fluid may then moisten or saturate that portion of the textile base member 20 allowing a user to apply the fluid to a desired surface by contacting the moistened or saturated portion of the textile base member 20 with the desired surface. The use and overall structure of the permeable bladder embodiment is identical to that of the spray applicator embodiment, except for the manner in which the fluid is applied to the desired surface.

All embodiments of the present invention may further comprise at least one retaining element 70. As shown in FIGS. 8A-8C, at least one retaining element 70 may be incorporated into the device 100 of the present invention to provide an attachment point between the device 100 and a structure within the surrounding environment when the device 100 is not in use. In a preferred method of use, the device 100 of the present invention may be used to sanitize gym equipment and the at least one retaining element 70 may be used to releasably secure the device 100 to a piece of gym equipment or other nearby object while the user is performing an exercise or otherwise not actively using the device 100. This eliminates the need for a user to either constantly carry the device 100 or risk contaminating or soiling the device 100 by having to place the device 100 on the ground. The at least one retaining element 70 may include but is not limited to at least one strap 70a, at least one eyelet 70b, at least two complimentary snap fasteners 70c, and the like. The at least one strap 70a may either be permanently fixed to the device 100 or have at least one releasable attachment to the device 100 that includes but is not limited to hook and loop fasteners, a plurality of buttons, at least two complimentary snap fasteners, and the like. The at least one eyelet 70b (e.g. a grommet) may allow for the device 100 to be hung from an available hook, peg, post, or any other available structure capable of fitting through the at least one eyelet 70b. The at least two complimentary snap fasteners 70c may allow the device 100 to be releasably secured about an object by passing the at least two complimentary snap fasteners 70c around opposite sides of the object and then releasably securing the at least two complimentary snap fasteners 70c together behind the object.

In use, the spray applicator embodiment of the present invention allows a user to apply a fluid to any desired surface by activating the spray nozzle 11. The spray nozzle 11 dispenses fluid from the fluid reservoir 12 onto the desired surface. The textile base member 20 may then be used to wipe the desired surface, remove excess fluid, dry a user's hands, or the like. Similarly, embodiments comprising a roll-on applicator 64 may apply fluid to a desired surface via physical contact between the surface and the rotatable ball member of the roll-on applicator 64 wherein movement of the rotatable ball member allows for the release or dispensing of fluid from the fluid reservoir 12. In use, the permeable bladder embodiment of the present invention allows a user to apply a fluid to any desired surface by activating the permeable bladder 65 containing a fluid. Activation of the permeable bladder 65 may occur through application of a force such as compression on the permeable bladder 65. The application of such a force may cause a fluid stored within the permeable bladder 65 to exude or emanate from the permeable bladder 65. The fluid may then moisten or saturate the first layer 21 and/or the second layer 22 of the textile base member 20. A user may then apply the fluid to a desired surface by contacting the desired surface with the moistened or saturated region of the textile base member 20.

While preferred embodiments of the present inventive device are expressly disclosed for applying a fluid such as a cleaning agent or sunscreen to an object, the present invention may be utilized for the application of any known fluid to an object or surface. Any such functional fluids may be dispensed by a spray applicator embodiment, a roll-on embodiment, or a permeable bladder embodiment to provide the benefits of the fluid to any desired object or surface.

While the above description contains much specificity, these should not be construed as limitations on the scope of any embodiment, but as exemplifications of the presently preferred embodiments thereof. Many other ramifications and variations are possible within the teachings of the various embodiments.

Thus the scope of the invention should be determined by the appended claims and their legal equivalents, and not by the examples given.

What is claimed is:

1. A liquid application device, comprising:
    a textile base member comprising:
    a first textile layer and a second textile layer, said first textile layer comprising a greater surface area than said second textile layer, wherein said second textile layer is defined as being elongate and having a short side and a long side and wherein said second textile layer overlays a portion of said first textile layer thereby forming an elongate liquid reservoir cavity having a short side and a long side between said first textile layer and said second textile layer, wherein said elongate liquid reservoir cavity comprises an opening in said elongate liquid reservoir cavity short side;
    a liquid reservoir disposed within said elongate liquid reservoir cavity, wherein said liquid reservoir comprises an elongate tube;
    a liquid applicator attached to and in liquid communication with said liquid reservoir, wherein at least a portion of said liquid applicator extends through said opening in said short side of said elongate liquid reservoir cavity and wherein said liquid applicator extends beyond an edge of said base member; and
    at least one releasable connection securing said second layer to said first layer and providing releasable access to said liquid reservoir cavity.

2. The liquid application device of claim 1, further comprising:
    at least one retaining element, wherein said at least one retaining element is selected from the group consisting of at least one eyelet, at least one strap, and at least two complimentary snap fasteners.

3. The liquid application device of claim 1, wherein said liquid applicator comprises a spray nozzle in liquid communication with said liquid reservoir.

4. The liquid application device of claim 1, wherein said liquid reservoir contains a liquid comprising a cleaning agent.

5. The liquid application device of claim 1, wherein said liquid reservoir contains a liquid comprising sunscreen.

6. The liquid application device of claim 1, wherein said textile base member comprises a towel.

7. The liquid application device of claim 1, wherein said at least one releasable connection is selected from the group consisting of hook and loop fasteners, at least one zipper, a plurality of buttons, and at least two complimentary snap fasteners.

8. The liquid application device of claim 3, wherein said liquid reservoir is pressurized to facilitate use of said spray nozzle.

9. The liquid application device of claim 3, wherein said spray nozzle further comprises a manual pump spray head.

10. The liquid application device of claim 1, further comprising a utility pocket disposed on said first layer of said base member, wherein said utility pocket comprises a textile member having a first, second, third and fourth side and said textile member is attached to said first layer of said base member on said first, said second and said third sides, said attachment on said first, said second and said third sides forming said utility pocket having an interior space accessible through said fourth side.

11. A liquid application device, comprising:
    a textile base member comprising:
    a textile base member comprising a linear fold point wherein said textile base member is folded along said linear fold point forming a folded portion such that said folded portion overlays a portion of said textile base member further forming a connection between said folded portion and said textile base member, thereby forming an elongate liquid reservoir cavity between said folded portion and said textile base member, wherein said elongate liquid reservoir cavity has a short side and a long side formed by said overlayment of said folded portion onto said textile base member, and wherein said elongate liquid reservoir cavity comprises an opening in said sort side of said elongate liquid reservoir cavity;
    a liquid reservoir disposed within said elongate liquid reservoir cavity, said liquid reservoir further defined as an elongate tube; and
    a liquid applicator attached to and in liquid communication with said liquid reservoir;
    wherein at least a portion of said liquid applicator extends through said opening in said short side of said elongate liquid reservoir cavity and beyond an edge of said base member; and wherein said connection is further defined as a releasable connection for securing said folded portion to said base member and providing releasable access to said elongate liquid reservoir cavity.

12. The liquid application device of claim 11, further comprising:
at least one retaining element, wherein said at least one retaining element is selected from the group consisting of at least one eyelet, at least one strap, and at least two complimentary snap fasteners.

13. The liquid application device of claim 11, wherein said liquid applicator comprises a spray nozzle in liquid communication with said liquid reservoir.

14. The liquid application device of claim 11, wherein said liquid reservoir contains a liquid comprising a cleaning agent.

15. The liquid application device of claim 11, wherein said liquid reservoir contains a liquid comprising sunscreen.

16. The liquid application device of claim 11, wherein said textile base member comprises a towel.

17. The liquid application device of claim 11, wherein said at least one releasable connection is selected from the group consisting of hook and loop fasteners, at least one zipper, a plurality of buttons, and at least two complimentary snap fasteners.

18. The liquid application device of claim 13, wherein said liquid reservoir is pressurized to facilitate use of said spray nozzle.

19. The liquid application device of claim 13, wherein said spray nozzle further comprises a manual pump spray head.

20. A liquid application device, comprising:
a textile base member comprising:
a textile base member comprising a linear fold point wherein said textile base member is folded along said linear fold point forming a folded portion such that said folded portion overlays a portion of said textile base member further forming a connection between said folded portion and said textile base member, thereby forming an elongate liquid reservoir cavity between said folded portion and said textile base member and wherein said connection is further defined as a releasable connection for securing said folded portion to said base member and providing releasable access to said elongate liquid reservoir cavity, wherein said elongate liquid reservoir cavity has a short side and a long side formed by said overlayment of said folded portion onto said textile base member, and wherein said elongate liquid reservoir cavity comprises an opening in said sort side of said elongate liquid reservoir cavity;
a liquid reservoir disposed within said elongate liquid reservoir cavity, said liquid reservoir further defined as an elongate tube; and
a liquid applicator attached to and in liquid communication with said liquid reservoir, wherein at least a portion of said liquid applicator extends through said opening in said short side of said elongate liquid reservoir cavity and wherein said at least a portion of said liquid applicator extends beyond an edge of said textile base member; and
a utility pocket disposed on said first layer of said textile base member, wherein said utility pocket comprises a textile member having a first, second, third and fourth side and said textile member is attached to said first layer of said textile base member on said first, said second and said third sides, said attachment on said first, said second and said third sides forming said utility pocket having an interior space accessible through said fourth side.

* * * * *